2,989,364
PROCESS FOR THE IMPROVEMENT OF SHAPED THERMOPLASTIC MATERIALS CONTAINING CARBONAMIDE GROUPS
Karl Goldann, Dusseldorf, Germany, assignor to Bohme Fettchemie G.m.b.H., Dusseldorf, Germany, a corporation of Germany
No Drawing. Filed Aug. 12, 1957, Ser. No. 677,780
Claims priority, application Germany Aug. 16, 1956
11 Claims. (Cl. 8—115.5)

This invention relates to a process of improving the physical and chemical properties of shaped bodies or structures made from thermoplastic materials containing carbonamide groups, and more particularly to a method of improving the hydrophilic and antistatic properties of such materials while maintaining the original shape of the material.

Thermoplastic synthetic materials which contain acid amide groups have heretofore been treated with alkylene oxides to improve certain of their properties; for example, by allowing the thermoplastic synthetic materials to swell in admixture with an alkylene oxide, and subsequently heating the mixture while introducing additional amounts of alkylene oxide. However, the modified materials obtained thereby are gel-like to oily in consistency and are therefore not capable of retaining a predetermined shape of any kind. Thus, synthetics treated in this manner become virtually useless as shapable thermoplastic materials without further modification.

It is also known to treat polyamide fibers with large quantities of alkylene oxide, whereby flexible products are obtained. This treatment produces a substantial change in the original polyamide fiber structure and thereby imparts the fiber with modified properties which are especially adapted to special purposes of use, but which are unsuitable for customary uses in the textile field.

It is therefore an object of this invention to provide a method for improving the hydrophilic and antistatic properties of shaped bodies containing carbonamide groups.

Another object is to provide a method for reacting lactones or sultones with shaped structures containing carbonamide groups.

Another object is to provide a method for treating shaped structures to improve their dyeing properties while maintaining the original structure.

These and other objects of my invention will become apparent as the description thereof proceeds.

I have found that the properties of shaped bodies made from thermoplastic material containing carbonamide groups in the molecule can be improved while completely maintaining their shape if these bodies are reacted with small amounts of alkylating cyclic acid esters or acid amides.

The term "shaped bodies containing carbonamide groups" includes primarily the known condensation products formed from dicarboxylic acids and diamides or from caprolactam as well as condensation products formed from diisocyanates or diamides or diols and those shaped bodies which are produced from natural substances containing carbonamide groups, such as polypeptides.

Primarily suitable for carrying out the alkylation reaction are propiolactones, butyrolactones, propane sultone and butane sultones. In addition other lactones and sultones, such as oxy ethoxy acetic acid lactone, caprolactam, tolyl sultone, naphthalene sultone and the like, wherein the hydrocarbon radicals of the alklating agent may also contain substances such as halogen, may also be used. Sultones of the type included within the scope of my invention are disclosed in Hackh's Chemical Dictionary, 3rd Edition, 1944, p. 822, and in United States Patent No. 2,833,781 to Haas, at column 2.

The alkylation achieves a substantial improvement in the properties of the shaped bodies. More particularly the shaped bodies, by introduction of a carboxylic acid or sulfonic acid group into the molecule, become hydrophilic and are imparted with an improved affinity for dyes, especially for basic dyestuffs, and are considerably superior to the untreated shaped bodies with respect to their antistatic properties. The acid character as well as the degree of reaction of the surface alkylated products can be determined by acidimetric determination of the alkylation content.

The alkylation does not substantially change the mechanical and structural base properties of these products, such as tensile strength, elongation, resistance to cracking, melting point and the like. The shaped bodies may be subjected to this treatment in all known forms, that is, in the form of fibers, threads, flakes, films, hose tubes, blocks or also in the form of corresponding manufactured products, such as spun fibers, knitted fabrics, woven fabrics, jackets, coatings, painted surfaces and molded forms. The shaped bodies may also contain additives, such as other shapable substrates, fillers, dyes, etc.

The process in accordance with the present invention is carried out by treating the shaped bodies at room temperature or elevated temperatures in the presence of basic agents with the above-named alkylating agents; the treatment may, if desired, also be carried out in the presence of solvents.

An especially advantageous method consists of reacting the shaped bodies, made of polyamide condensates, in the presence of a strong base such as sodium hydroxide as a catalyst at room temperature or elevated temperatures with the alkylating agent. For this purpose the shaped bodies, such as polyamide fibers or fabrics are first impregnated with sodium hydroxide solution, squeeze dried and thereafter immersed into a solution or suspension of the alkylating agent. If the alkylating agent exists in the liquid phase at the desired temperature it is also possible to carry out the reaction without the aid of a solvent. Finally one may also proceed by treating the shaped body which has been impregnated with a dilute sodium hydroxide solution with a dispersion of the liquid alkylating agent in an inert solvent. In accordance with a further embodiment of the present invention it is also possible to impregnate the shaped bodies first with the alkylating agent or a solution or suspension thereof, squeeze drying the impregnated material and subsequently treating the same with the basic agents such as sodium hydroxide.

The reaction proceeds exothermically so that in some cases it is unnecessary to provide external heat.

Solvents which are suitable for carrying out the process include aromatic hydrocarbons, such as benzene, toluene, xylene or aliphatic hydrocarbons, such as benzene, as well as dioxane, tetrahydro naphthalene, decahydro naphthalene, ether, water and the like. In addition to alkali metal hydroxides other known catalysts which accelerate the cleavage of lactones, sultones or lactams, such as alcoholates, alkali earth metal hydroxides, organic bases, quaternary ammonium compounds and the like may be used as the basic agent.

The quantity of alkylating agent which is reacted in the process of the invention is very small. A good impregnation effect is obtained with small amounts of alkylating agent of the order of magnitude of 0.1–0.5% based on the weight of shaped body containing carbonamide groups. Larger quantities may, however, also be used.

Subsequent to the treatment, the polyamide fiber material or other shaped material is freed from excesses of reactant and if necessary also from adhering solvent, washed and dried. The material does not exhibit any substantial changes in shape and possesses the usual mechanical properties of the starting material to a virtual unchanged degree. Furthermore, it does not exhibit any substantial changes in color so that it is for all practical purposes undistinguishable from the starting material. The alkylating agent absorbed by the fiber cannot be removed by customary methods, such as rapid laundering, but instead is combined with the base material by chemical combination.

The shaped bodies treated with the alkylating agents may be further improved with respect to their properties by reacting the same with reaction agents which react with the reactive groups introduced by the alkylation. For example, the carboxylic acid or sulfonic acid groups introduced by the alkylation may be reacted with the customary esterification or amidification agents. By means of such a chemical modification it is possible to further modify the properties of the impregnation and the properties and appearance of the finished product.

The following examples are set forth to enable persons skilled in the art to understand and practice my invention and are not intended to be limitative.

*Example I*

5 parts by weight of a polyamide staple fiber produced from caprolactam were impregnated with a 20% sodium hydroxide solution, squeeze dried, permitted to lie in the open air for 30 minutes and then immersed in a solution of 30 parts by weight of propane sultone in 70 parts by volume of toluene; the temperature rises to 43° C. The fiber is allowed to remain in the solution for 90 minutes with occasional agitation. After washing the modified fiber several times and drying it, it did not exhibit any appreciable change in weight. The fiber was light in color and hydrophilic. The electrical resistance of the untreated material was $10,000 \times 10^9$ ohms, and after the treatment it was $39 \times 10^9$ ohms; the treated material is, therefore, antistatic. After laundering the treated material four times with a commercially fatty alcohol sulfate detergent the staple fiber still had an electrical resistance of $130 \times 10^9$ ohms which shows that the impregnation was resistant to laundering.

*Example II*

5 parts by weight of a polyamide fabric strand produced from caprolactam were pre-treated with a 30% sodium hydroxide solution as in Example I and thereafter immersed under the conditions described in Example I, in a solution of 30 parts by weight of propane sultone in 70 parts by volume of water which also contained 3% by weight of a suitable wetting agent based on a fatty alcohol sulfate. The properties of the alkylated fabric after laundering corresponded approximately to those of the staple fiber described in Example I. The electrical resistance of the treated fabric was $390 \times 10^9$ ohms, whereas the resistance of the starting material was $10,000 \times 10^9$ ohms. After laundering the treated fabric four times it still had an electrical resistance of $390 \times 10^9$ ohms.

*Example III*

5 parts by weight of a polyamide staple fiber produced from adipic acid and hexamethylene diamine were treated as described in Example I. The electrical resistance after the treatment was $20 \times 10^9$ ohms as compared with the electrical resistance of $10,000 \times 10^9$ ohms of the untreated starting material.

*Example IV*

10 parts by weight of a polyamide yarn produced from caprolactam were pre-treated as described in Example II and thereafter immersed into a dispersion of 60 parts by weight of propane sultone in 140 parts by volume of water. Thereafter the treated yarn was finished and dried as described in Example I. Upon laundering the treated fabric four times it had an electrical resistance of $34 \times 10^9$ ohms. The rate of wetting in distilled water and thereafter the hydrophilic properties of the treated fabric, had substantially increased in comparison to the untreated yarn.

*Example V*

5 parts by weight of a polyamide staple fiber produced from caprolactam were pre-treated with a sodium hydroxide solution as described in the previous examples and thereafter immersed in a dispersion of 10 parts by weight of propane sultone in 90 parts by volume of water; the fabric was allowed to remain in this solution for 90 minutes with occasional agitation. After finishing and drying the fabric as described under Example I, the staple fiber had an electrical resistance of $180 \times 10^9$ ohms. In order to determine the degree of reaction 5 gm. of the treated fiber material were repeatedly washed and thereafter titrated in aqueous suspension with a $\frac{1}{10}$ Normal sodium hydroxide solution; 1.05 milliliters of $\frac{1}{10}$ Normal sodium hydroxide were used up. A corresponding titration of the untreated fiber material resulted in the use of only 0.3 milliliters of $\frac{1}{10}$ Normal sodium hydroxide.

*Example VI*

5 parts by weight of a polyamide staple fiber produced from caprolactam were impregnated with a 20% sodium hydroxide solution, squeeze dried, allowed to lie in the open air for 30 minutes and subsequently immersed into a mixture of 30 parts by weight of butane sultone (technical mixture) and 70 parts by volume of water; the fiber was allowed to remain in this aqueous mixture for 1½ hours accompanied by mechanical agitation. The washed and dried treated fabric had an electrical resistance of $90 \times 10^9$ ohms.

*Example VII*

5 parts by weight of a polyamide staple fiber produced from caprolactam were pre-treated in the customary manner with sodium hydroxide and thereafter immersed in a solution of 30 parts by weight of butyrolactone in 70 parts by volume of toluene and allowed to remain in this solution at 50° C. for 1½ hours with agitation. The washed and dried treated fiber had an electrical resistance of $200 \times 10^9$ ohms whereas the original untreated fiber had an electrical resistance of $10,000 \times 10^9$ ohms.

*Example VIII*

5 parts by weight of a polyamide yarn produced from caprolactam were pre-treated with sodium hydroxide as described in Example I and thereafter immersed into a solution of 30 parts by weight of propiolactone in 70 parts by volume of water. The exothermic reaction was first counteracted by cooling, but thereafter the yarn was allowed to remain in the solution for 1½ hours at 30° C. without cooling. The washed yarn had an electrical resistance of $190 \times 10^9$ ohms. In order to demonstrate the improved dyeing properties a treated polyamide yarn and an untreated merely washed polyamide yarn were each dyed with 3% of the basic dyes methylene blue BB extra and diamine green B (based on the weight of yarn). This comparison showed that the treatment of the polyamide yarn with propiolactone strongly increased the affinity of the yarn for basic dyestuffs while the untreated yarn exhibited poor dyeing properties.

*Example IX*

5 parts by weight of a polyamide staple fiber produced from caprolactam were impregnated with a 20% sodium hydroxide solution, squeeze dried, allowed to remain in the open air for 30 minutes and, were thereafter immersed in a solution of 50 parts by weight of caprolactam and 50 parts by volume of water. The solution was heated for 90 minutes at 90° C. and subsequently the fiber was freed from adhering solvent and excess caprolactam by washing. Finally the fiber was thoroughly laundered and rinsed five times with distilled water. The fiber treated in this manner had a markedly soft feel. Its electrical resistance was $350 \times 10^9$ ohms. The above aqueous solution of caprolactam can be repeatedly used for the alkylation of additional quantities of fiber.

*Example X*

5 parts by weight of a polyamide staple fiber produced from caprolactam were impregnated with a 20% solution of potassium hydroxide, squeeze dried, allowed to lie in the open air and were thereafter immersed in a mixture of 30 parts by weight of propiolactone and 70 parts by volume of water. The solution was maintained for 90 minutes at 30° C. After washing and drying the fiber it had an electrical resistance of $190 \times 10^9$ ohms. For a determination of the degree of reaction 5 gm. of the treated polyamide staple fiber were washed repeatedly and thereafter titrated with $1/10$ Normal sodium hydroxide. 0.70 milliliter $1/10$ Normal sodium hydroxide was used up, and corresponding titration of untreated fiber material resulted in a use of 0.25 milliliter $1/10$ Normal sodium hydroxide.

While I have set forth preferred embodiments of my invention, it will be understood that I do not intend to be limited thereby, and that various modifications of the invention may be made without departing from the spirit of the disclosure and the scope of the following claims. In the above quoted examples the washing step after the alkylating treatment was performed by an anion-active substance being resistant to salts causing hardness such as higher molecular alkyl sulfates, alkyl sulfonates, alkyl benzene sulfonates, alkyl phosphates and the like. The best washing agents for these purposes are the sodium salts of the acid alkyl sulfates as dodecyl sodium sulfate, oleyl sodium sulfate, an alkyl sodium sulfate mixture having alkyl radicals of $C_{12}$–$C_{18}$ and the sodium tetrapropyl benzene sulfonate.

I claim:

1. A process for the improvement of the hydrophilic and antistatic properties of shaped bodies containing carbonamide groups wherein the original shape of the body is maintained, which comprises reacting said bodies in the presence of a basic agent with compounds which act as alkylating agents for said carbonamide groups, at a temperature ranging from room to elevated temperatures wherein the alkylating agents are selected from the group consisting of sultones, lactones and lactams.

2. The process of claim 1 wherein the alkylating agent is used in an amount betwen about 0.1 and 0.5% based on the weight of said body.

3. The process of claim 1 wherein the basic agent is appplied prior to the alkylating agent.

4. The process of claim 1 wherein the basic agent is applied after the alkylating agent.

5. The process of claim 1 wherein the alkylating agent is a lactone.

6. The process of claim 1 wherein the alkylating agent is a sultone.

7. The process of claim 1 wherein the alkylating agent is a lactam.

8. The process of claim 1 wherein the alkylating agent is caprolactam.

9. The process of claim 1 wherein said shaped bodies subsequent to the alkylation reaction are washed with organic anion-active salts resistant to salts which cause hardness in water.

10. A process for the improvement of the hydrophilic and antistatic properties of shaped bodies containing carbonamide groups wherein the original shape of the body is maintained, which comprises treating said body with a basic agent, and subsequently treating said body with 0.1 to 0.5% of a compound which acts as an alkylating agent for the carbonamide groups, said compound being selected from the group consisting of sultones, lactones and lactams, at moderate temperatures.

11. The process of claim 10 wherein the basic agent is sodium hydroxide.

References Cited in the file of this patent

UNITED STATES PATENTS

| | | |
|---|---|---|
| 2,364,387 | Peterson | Dec. 5, 1944 |
| 2,719,156 | Benneville et al. | Sept. 27, 1955 |

OTHER REFERENCES

Alexander et al.: "Wool: Its Chemistry and Physics," Reinhold Pub. Corp., N.Y., 1954, pp. 327 and 328.

UNITED STATES PATENT OFFICE
CERTIFICATE OF CORRECTION

Patent No. 2,989,364            June 20, 1961.

Karl Goldann

It is hereby certified that error appears in the above numbered patent requiring correction and that the said Letters Patent should read as corrected below.

Column 2, line 56, for "benzene" read -- benzine --.

Signed and sealed this 13th day of February 1962.

(SEAL)
Attest:

ERNEST W. SWIDER
Attesting Officer

DAVID L. LADD
Commissioner of Patents